United States Patent
Hassan

(10) Patent No.: US 9,740,438 B2
(45) Date of Patent: Aug. 22, 2017

(54) ALLOCATING MEMORY ON MULTIPLE TYPES OF MAIN MEMORY TECHNOLOGIES FROM SOFTWARE APPLICATION LAYER

(71) Applicant: SAP SE, Walldorf (DE)

(72) Inventor: Ahmad Hassan, Belfast (GB)

(73) Assignee: SAP SE, Walldorf (DE)

( * ) Notice: Subject to any disclaimer, the term of this patent is extended or adjusted under 35 U.S.C. 154(b) by 43 days.

(21) Appl. No.: 14/831,567

(22) Filed: Aug. 20, 2015

(65) Prior Publication Data
US 2017/0052741 A1 Feb. 23, 2017

(51) Int. Cl.
*G06F 12/00* (2006.01)
*G06F 3/06* (2006.01)
*G06F 12/02* (2006.01)
*G06F 12/1009* (2016.01)

(52) U.S. Cl.
CPC .......... *G06F 3/0685* (2013.01); *G06F 3/0622* (2013.01); *G06F 3/0637* (2013.01); *G06F 12/0238* (2013.01); *G06F 12/0284* (2013.01); *G06F 12/1009* (2013.01); *G06F 3/0647* (2013.01); *G06F 2212/1044* (2013.01)

(58) Field of Classification Search
None
See application file for complete search history.

(56) References Cited

U.S. PATENT DOCUMENTS

| | | | |
|---|---|---|---|
| 7,774,556 B2* | 8/2010 | Karamcheti | G06F 9/5016 711/146 |
| 2011/0093654 A1* | 4/2011 | Roberts | G06F 1/3203 711/105 |
| 2014/0047251 A1* | 2/2014 | Kottilingal | G06F 1/3296 713/320 |
| 2014/0189261 A1* | 7/2014 | Hildesheim | G06F 12/1027 711/152 |

OTHER PUBLICATIONS

Schwalb, et al., "nvm_malloc: Memory Allocation for NVRAM", © Jul. 16, 2015, p. 1-12.*
Barroso and Holzle, "The datacenter as a computer: An introduction to the design of warehouse-scale machines," Synthesis Lectures on Computer Architecture, 2009, 4(1):1-108.
Bienia et al., "The PARSEC benchmark suite: Characterization and architectural implications," In PACT, 2008, 22 pages.
Binkert et al., "The GEM5 simulator," SIGARCH Comput. Archit. News, Aug. 2011, 39(2):1-7.
(Continued)

*Primary Examiner* — Brian Peugh
(74) *Attorney, Agent, or Firm* — Fish & Richardson P.C.

(57) ABSTRACT

Implementations of the present disclosure include methods, systems, and computer-readable storage mediums for receiving, from an application being executed, a memory allocation request, the memory allocation request indicating a type of physical memory in a hybrid memory system, providing a virtual memory area based on the type of physical memory, providing a mapping entry that maps the virtual memory area to the type of physical memory, and enabling access to physical memory in the hybrid memory based on a plurality of mapping entries, the mapping entry being included in the plurality of mapping entries.

20 Claims, 5 Drawing Sheets

(56) References Cited

OTHER PUBLICATIONS

Blagodurov et al., "A Case for NUMA-aware Contention Management on Multicore Systems," Proceedings of the 2011 USENIX Conference on USENIX Annual Technical Conference, USENIXATC'11, 2011, 15 pages.
Boncz et al., "Breaking the memory wall in MonetDB," Commun. ACM, Dec. 2008, 51(12):77-85.
Boncz et al., Database Architecture Optimized for the New Bottleneck: Memory Access Database Architecture Optimized for the New Bottleneck: Memory Access, VLDB '99, 1999, 12 pages.
Burger and Austin, "The simplescalar tool set, version 2.0," SIGARCH Comput. Archit. News, Jun. 1997, 25(3):21 pages.
Burr et al., "Overview of candidate device technologies for storage-class memory," IBM J. of Res. and Dev., Jul. 2008, 52(4.5)449-464.
Calder et al., "Cache-conscious data placement," ASPLOS, 1998, pp. 139-149.
Cho et al., "Decoupling local variable accesses in a wide-issue superscalar processor," In ISCA, 1999, pp. 100-110.
Coburn et al., "NVHeaps: making persistent objects fast and safe with next-generation, nonvolatile memories," Proceedings of the sixteenth international conference on Architectural support for programming languages and operating systems, ASPLOS 2011, 13 pages.
Dhiman et al., "PDRAM: A hybrid PRAM and DRAM main memory system," In DAC, 2009, 6 pages.
Doller, "Forging a future in memory—new technologies, new markets, new applications," In Hot Chips Tutorials, 2010, 28 pages.
Guerra et al., "Software persistent memory," Proceedings of the 2012 USENIX conference on Annual Technical Conference, 2012, pp. 1-13.
Guthaus et al., "Mibench: A free, commercially representative embedded benchmark suite," In WWC, 2001, 12 pages.
Ho et al., "Nonvolatile memristor memory: Device characteristics and design implications," In ICCAD, 2000, pp. 485-490.
Hu et al., "Data allocation optimization for hybrid scratch pad memory with SRAM and nonvolatile memory," TVLSI, Jun. 2013, 21(6):1004-1102.
Huang and Nagarajan, "ATCache: Reducing DRAM cache latency via a small SRAM tag cache," In PACT, 2014, pp. 51-60.
ITRS. International Technology Roadmap for Semiconductors, 2011 edition, 2011, 110 pages.
Keeton et al., "Performance Characterization of a Quad Pentium Pro SMP Using OLTP Workloads," Proceedings of the 25th Annual International Symposium on Computer Architecture, ISCA '98, 1998, 18 pages.
Kultursay et al., "Evaluating STT-RAM as an energy-efficient main memory alternative," In ISPASS, Apr. 2013, pp. 256-267.
Lee and Tyson, "Region-based caching: An energy-delay efficient memory architecture for embedded processors," In CASES, 2000, 8 pages.
Lee et al., "Architecting phase change memory as a scalable dram alternative," In ISCA, 2009, pp. 2-13.
Lee et al., "MediaBench: A tool for evaluating and synthesizing multimedia and communications systems," In MICRO, 1997, pp. 330-335.
Lefurgy et al., "Energy management for commercial servers," Computer, 2003, 36(12):39-48.
Li et al., "Compiler-assisted preferred caching for embedded systems with STT-RAM based hybrid cache," In LCTES, 2012, pp. 109-118.
Li et al., "Identifying opportunities for byte-addressable non-volatile memory in extreme-scale scientific applications," In IPDPS, 2012, pp. 945-956.
Meisner et al., "Powernap: eliminating server idle power," In ASPLOS, 2009, pp. 205-2016.
Meza and Mutlu, "Evaluating row buffer locality in future nonvolatile main memories," AFARI Technical Report No. 2012-002, Carnegie Mellon University, Dec. 2012, 12 pages.
Micron TN-41-01: Calculating memory system power, Available at URL: http://www.micron.com/products/support/power-calc., Last consulted: Nov. 2014, 24 pages.
Mirhoseini et al., "Coding-based Energy Minimization for Phase Change Memory," Proceedings of the 49th Annual Design Automation Conference, 2012, pp. 68-76.
Mogul et al., "Operating system support for NVM+DRAM hybrid main memory," In HotOS, 2009, 5 pages.
Perez and De Rosa, "Non-volatile memory: Emerging technologies and their impacts on memory systems," Technical Report, 2010, 44 pages.
Qureshi et al., "Scalable high performance main memory system using phase-change memory technology," In ISCA, 2009, pp. 24-33.
Ramos et al., "Page placement in hybrid memory systems," In ICS, 2011, 11 pages.
Raoux et al., "Phase-change random access memory: A scalable technology," IBM J. of Res. And Dev., Jul. 2008, 52(4.5):465-479.
Thoziyoor et al., "A Comprehensive Memory Modeling Tool and Its Application to the Design and Analysis of Future Memory Hierarchies," Proceedings of the 35th Annual International Symposium on Computer Architecture, ISCA 2008, pp. 51-62.
Tozun et al., "OLTP in Wonderland: Where Do Cache Misses Come from in Major OLTP Components?," Proceedings of the Ninth International Workshop on Data Management on New Hardware, 2013, 6 pages.
Vandierendonck et al., "On the energy-efficiency of byte-addressable non-volatile memory," Comput. Archit. Letters, 2014, PP(99):5 pages.
Yoon, "Row buffer locality aware caching policies for hybrid memories," In ICCD, 2012, 8 pages.
Zheng et al., "Mini-rank: Adaptive DRAM architecture for improving memory power efficiency," Proceedings of the 41st annual IEEE/ACM International Symposium on Microarchitecture, MICRO 41, 2008, 12 pages.
Zhou et al., "A durable and energy efficient main memory using phase change memory technology," ISCA, 2009, pp. 14-23, 10 pages.
Zilberberg et al., "Phase-change memory: An architectural perspective," ACM Comput. Surv., Jul. 2013, 45(3):29:1-29:33.

* cited by examiner

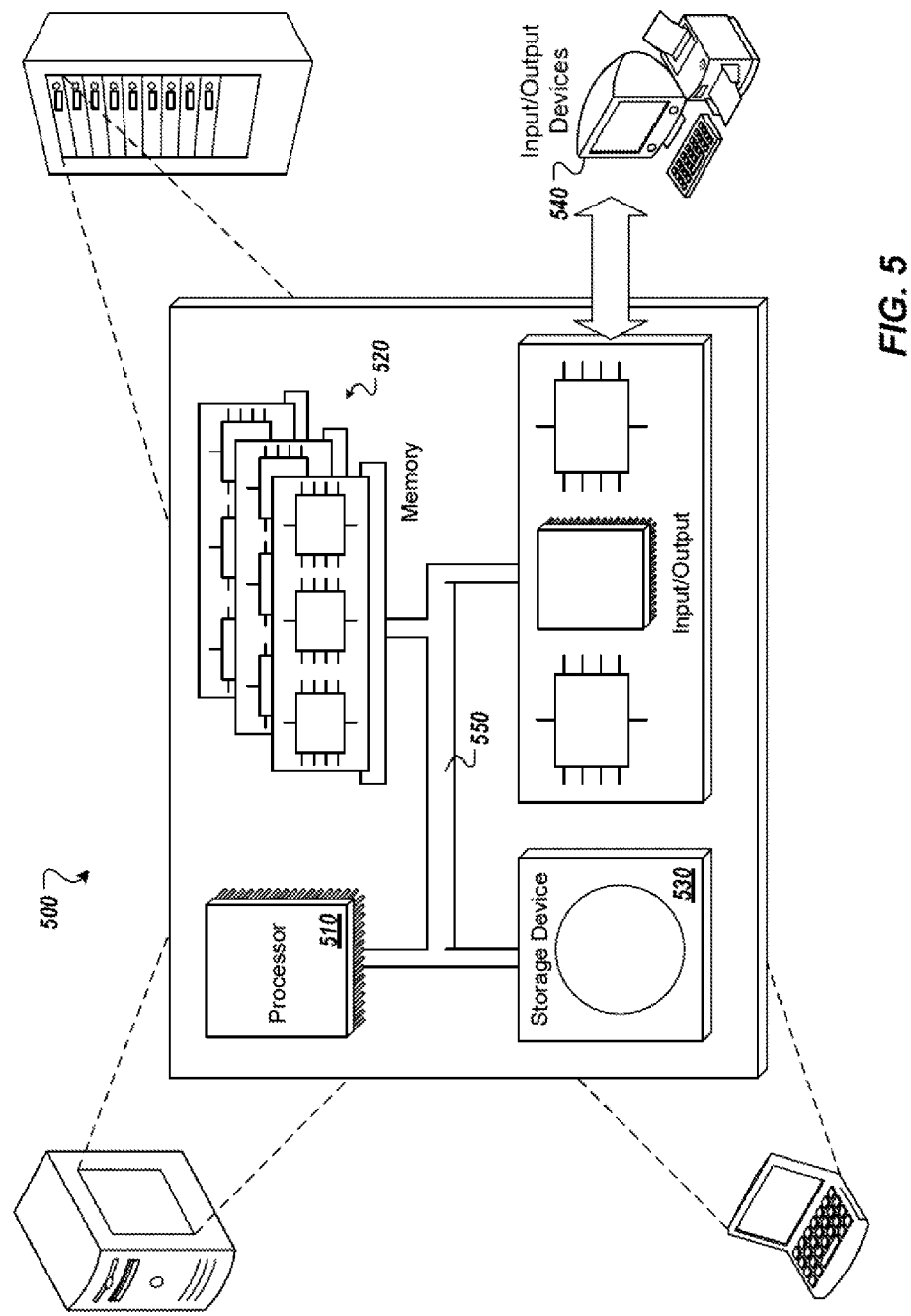

ALLOCATING MEMORY ON MULTIPLE TYPES OF MAIN MEMORY TECHNOLOGIES FROM SOFTWARE APPLICATION LAYER

BACKGROUND

Enterprises, such as business enterprises, operate enterprise systems to provide software functionality to customers and employees. In some examples, an enterprise system can include back-end enterprise servers that host enterprise applications. Example enterprise applications include enterprise resource planning (ERP) systems, client-relationship management (CRM) systems, product lifecycle management (PLM) systems, supply chain management (SCM) systems, and supplier relationship management (SRM) systems. During operation of an enterprise application, application data is accessed, which is stored in main memory of the enterprise server. In this manner, the application data is immediately accessible by processors of the enterprise server.

Increasingly large amounts of application data are stored in the main memory of enterprise servers. Main memory can include dynamic random access memory (DRAM), which consumes a relatively high amount of static energy (both in active and idle states) due to continuous leakage and refresh power. Storage class memory (SCM) (e.g., phase change memory (PCM)) can address fundamental limitations of DRAM. Characteristics that differentiate SCM from DRAM include data persistence, high latency, high write energy, low static energy and low write endurance (e.g., wear-out of cells). Physically, SCM is inserted into a memory bus along with DRAM.

SUMMARY

Implementations of the present disclosure include computer-implemented methods for extending virtual memory address regions of an operating system (OS) to allocate memory on multiple memory types directly from an application layer (e.g., application source code). In some implementations, methods include actions of receiving, from an application being executed, a memory allocation request, the memory allocation request indicating a type of physical memory in a hybrid memory system, providing a virtual memory area based on the type of physical memory, providing a mapping entry that maps the virtual memory area to the type of physical memory, and enabling access to physical memory in the hybrid memory based on a plurality of mapping entries, the mapping entry being included in the plurality of mapping entries.

These and other implementations can each optionally include one or more of the following features: the memory allocation request is received by a custom memory allocator of a plurality of custom memory allocators, each custom memory allocator corresponding to a respective type of physical memory in the hybrid memory system; an operating system executed by at least one computing device provides the virtual memory area and provides the mapping entry; each mapping entry corresponds to a respective type of physical memory in the hybrid memory system; each mapping entry is an e820 mapping entry; the memory allocation request is provided in response to execution of a memory allocation command of the application; the type of physical memory includes one of dynamic random access memory (DRAM) and storage class memory (SCM).

The present disclosure also provides one or more non-transitory computer-readable storage media coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

FIG. 5 is a schematic illustration of example computer systems that can be used to execute implementations of the present disclosure.

Like reference symbols in the various drawings indicate like elements.

DETAILED DESCRIPTION

Figure 1:
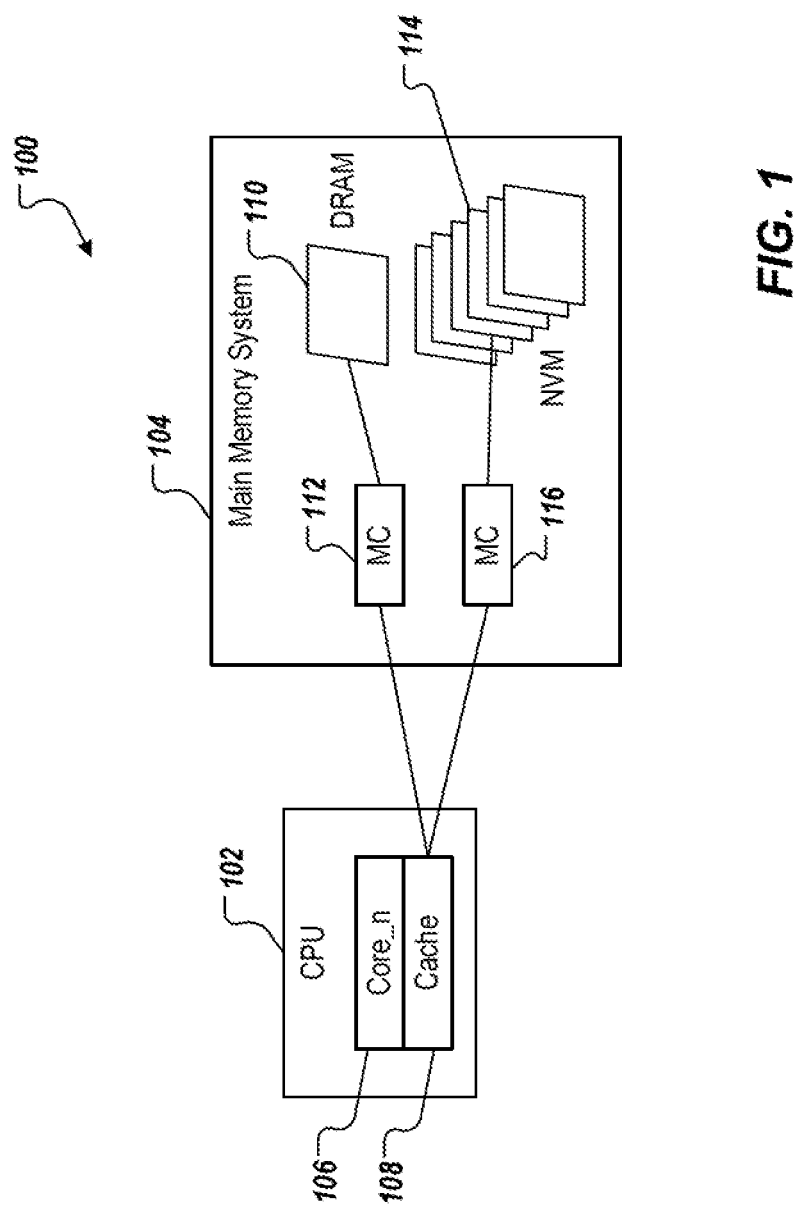
FIG. 1 depicts an example hybrid main memory architecture in accordance with implementations of the present disclosure.

Implementations of the present disclosure are generally directed to extending virtual memory address regions of an operating system (OS) to allocate memory on multiple memory types directly from an application layer (e.g., application source code). More particularly, implementations of the present disclosure are directed to receiving a memory allocation request, the memory allocation request indicating a type of physical memory in a hybrid memory system, providing a virtual memory area based on the type of physical memory, providing a mapping entry that maps the virtual memory area to the type of physical memory, and enabling access to physical memory in the hybrid memory based on a plurality of mapping entries, the mapping entry being included in the plurality of mapping entries. In some examples, and as described in further detail herein, implementations of the present disclosure obviate any need for significant modifications to the OS and/or the hardware.

DRAM scaling has been used to address management of application data in main memory of enterprise servers. As there are limits to DRAM scaling, storage class memory (SCM), such as byte-addressable non-volatile memory (NVM) (e.g., phase change memory (PCM)), is considered for use in main memory replacement. SCM, however, has certain disadvantages, which can vary between SCM technologies. Generally, disadvantages of SCM include increased latency and dynamic energy for SCM accesses, and reduced memory bandwidth and a fast wear-out of SCM devices as compared to DRAM. SCM, however, also has advantages. For example, NVM will scale to smaller feature sizes and has a significantly decreased lower static energy due to the absence of refresh operations (e.g., approximately 100× lower as compared to DRAM).

Hybrid main memory, including multiple types of memory (e.g., DRAM, SCM), is implemented to address the disadvantages of SCM. The concept behind hybrid main memory is that a small amount of DRAM holds frequently accessed data (hot data) and provides low latency and low dynamic energy, while a large amount of SCM is used to implement a scalable memory system and store the majority of less frequently accessed data (cold data). Implementations of the present disclosure address allocation of data to the different types of memory in hybrid main memory directly from the application layer.

To provide context for implementations of the present disclosure, the requirement for main memory capacity in data centers has increased significantly in the last decade. Consequently, the energy consumed by the data centers has correspondingly increased. For example, from 2005 to 2010, the worldwide energy consumption in data centers has increased by approximately 50%. As one example, electricity consumption in European data centers was approximately 56 TWh per year, and is projected to increase up to approximately 104 TWh per year by 2020. However, studies have shown that average server utilization in a data center ranges from 20-30%, for example. Further studies have revealed that main memory (DRAM) accounts for 30% of the total power consumed in a data center. Several studies have proposed techniques to minimize power consumption in DRAM, however, the problem is more fundamental. For example, because DRAM is volatile, it requires continuous static power (e.g., leakage power, refresh power). DRAM also has another fundamental issue of scaling limitation. For example, the scaling of DRAM to below 40 nm is questionable. In view of the fundamental limitations of DRAM, researchers are developing new types of memories, such as SCM. SCM is an emerging category of memories that offer non-volatility, byte-addressability, high density, energy efficiency, and low cost. For example, SCM provides byte-addressability like DRAM, and persistence like hard disks drives (HDDs). The scaling property and energy efficiency of SCMs, such as PCM, has become popular in research communities. SCM provides low cost and low energy alternatives to DRAM, and also offers core features like persistence and high scalability.

In some examples, studies on conventional DRAM have shown that the leakage energy is a significant portion of the total power consumed by DRAM, and should be a primary focus of energy conservation approaches. Unlike DRAM, SCM requires extremely low leakage power and no refresh power, and the scaling property of SCM is promising (e.g., unlike DRAM, PCM can scale down to approximately 10 nm).

Currently, SCM memories are not in mass scale production. However, application developers are using hardware simulation tools to simulate different types of SCM memories, and test their applications in simulated environments. In doing so, fundamental problems include, among others: how to allocate data on these new types of memories from an application, how the OS will manage new types of memories, what will be the interface between applications, OS, and real memory devices? For example, application programmers need an interface to allocate memory on multiple types of memories either in a simulation environment or on a real hardware.

In view of this, implementations of the present disclosure provide an interface to the application for allocating memory on multiple memory types. In some implementations, and as described in further detail herein, implementations of the present disclosure extend the existing memory management framework of the OS.

FIG. 1 depicts an example memory architecture 100 that can be implemented within an enterprise server. In the example of FIG. 1, the example memory architecture 100 includes a central processing unit (CPU) 102 and a main memory system 104. The CPU 102 includes a core 106 having a respective cache 108. Although a single core and respective cache 108 is depicted, it is appreciated that the CPU 102 can include multiple cores, each with a respective cache. Further, although a single CPU 102 is depicted, it is appreciated that enterprise servers can include multiple CPUs. The main memory system 104 includes DRAM 110 with a respective memory controller (MC) 112, and NVM 114 with a respective MC 116. In some examples, the cache 108 accesses (e.g., read, write, delete) the DRAM 110 through the MC 112, and accesses (e.g., read, write, delete) the NVM 114 through the MC 114.

In some examples, the example memory architecture 100 can be implemented in an in-memory database system. In some examples, an in-memory database system is a database management system that uses main memory for data storage. In some examples, main memory includes random access memory (RAM) that communicates with one or more processors, e.g., central processing units (CPUs), over a memory bus. An in-memory database system can be contrasted with database management systems that employ a disk storage mechanism. In some examples, in-memory database systems are faster than disk storage databases, because internal optimization algorithms can be simpler and execute fewer CPU instructions. In some examples, accessing data in an in-memory database system eliminates seek time when querying the data, which provides faster and more predictable performance than disk-storage databases. In some examples, an in-memory database can be provided as a column-oriented in-memory database, in which data tables are stored as sections of columns of data (rather than as rows of data). An example in-memory database system includes HANA, provided by SAP SE of Walldorf, Germany.

As introduced above, implementations of the present disclosure provide a programming interface (not depicted in FIG. 1). In some implementations, the programming interface exposes the hybrid nature of the main memory system 104 to application programmers. At the hardware level, the DRAM 110 and NVM 114 (e.g., memory chips) are assigned distinct physical address regions. This corresponds to how the basic input/output system (BIOS) reports dual in-line memory module (DIMMs) and their physical address ranges to the OS. In this case, the BIOS also reports the technology used to implement the DIMMs. The OS can select to allocate virtual memory pages on either type of memory (e.g., DRAM, NVM), depending on requirements set by the programmer.

Figure 2:
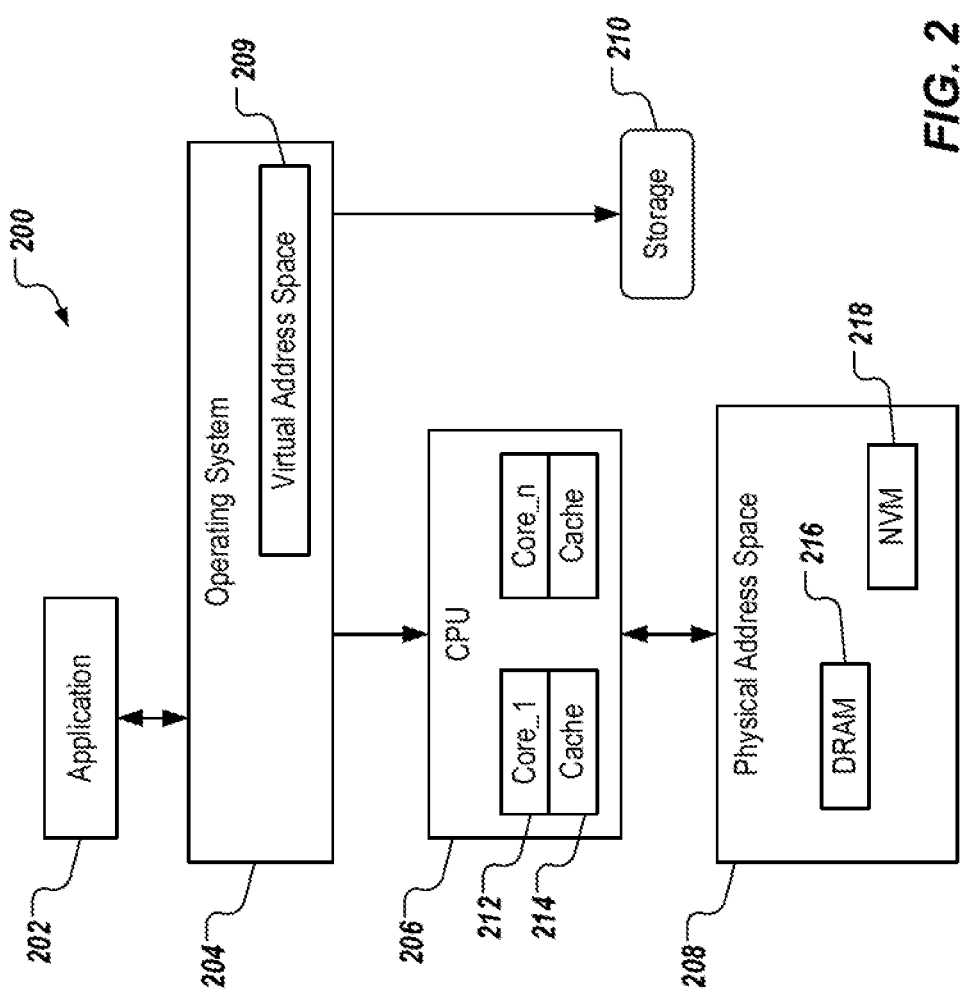
FIG. 2 depicts an example architecture in accordance with implementations of the present disclosure.

FIG. 2 depicts an example architecture 200 for storing data in accordance with implementations of the present disclosure. In the depicted example, the example architecture 200 includes an application 202, an OS 204, a CPU 206, a physical address space 208, a virtual address space 209, and storage 210. In some examples, execution of the application 202 is coordinated by the OS 204. The CPU 206 includes a plurality of cores 212 (Core_1, . . . , Core_n) with respective caches 214 (e.g., last-level cache (LLC)). In some examples, the CPU 206 coordinates read/write access to the physical address space 208, which is provided as a hybrid main memory (e.g., the main memory system 104 of FIG. 1), described herein. Accordingly, the physical address space 208 includes DRAM 216 and NVM 218 (e.g., for storing hot objects and cold objects, respectively).

In some examples, the application 202 is the application, for which data allocations between the DRAM 216 and NVM 218 are to be made. In some examples, the virtual address space 209 is provided as a set of binary addresses that is used by the operating system 204 to allocate memory addresses to any process requesting the memory. In some examples, the virtual address space 209 enables the processes to use more memory addresses than the actual DRAM memory available in the system. In some implementations, the operating system 204 manages the mappings between virtual addresses and physical addresses. In some examples, the storage 210 is provided as hard disk drive that is used for permanent storage of data.

As introduced above, implementations of the present disclosure provide an interface to the application for allocating memory on multiple memory types (e.g., in a hybrid memory system). In some examples, at the application layer, the application developer does not have access to the physical addresses of the actual memory hardware inserted into the memory bus of the hardware. For example, when a memory device is inserted into the hardware (e.g., the memory bus), it is associated with a set of addressable memory addresses, which are referred to as physical addresses. For example, in systems based on the x86 instruction set, the BIOS reports the physical address ranges of each memory device to the OS using a facility table, referred to as the e820 Table. The BIOS e820 Table is a memory map of physical address of the hardware reported to the kernel (e.g., Linux kernel). An example of e820 memory map is provided in the following example listing:

Listing 1: Example Linux Kernel BIOS-e820 Table

1  Linux version 2.6.22.9 Kernel boot
2  BIOS-provided physical RAM map:
3  BIOS-e820: 0000000000000000-000000000009fc00 (usable)
4  BIOS-e820: 000000000009fc00-00000000000100000 (reserved)
5  BIOS-e820: 0000000000100000-0000000020000000 (usable)
6  BIOS-e820: 0000000020000000-0000000100000000 (reserved)

In some examples, when an application developer allocates memory using a standard memory allocator (e.g., malloc or mmap in Linux OS), the OS returns the starting virtual address of the allocated memory. In some examples, the OS keeps a map of allowed virtual memory addresses, known as virtual memory areas (VMAs) that can be assigned to the memory allocation requests of the executing application. In accordance with implementations of the present disclosure, and as described in further detail herein, the OS ensures the correct translation of virtual address into the physical address, which represents the underlying, physical memory device, before accessing the physical memory device.

Implementations of the present disclosure enable an application developer to allocate memory on a hybrid DRAM and SCM system using minimal changes in the existing OS memory management mechanisms. In order to allocate memory in hybrid memory system, the memory allocators can make use of relatively large virtual address space, which is independent of the actual physical memory inserted into the hardware. For example, in 64-bit systems, 48-bits can be used for virtual addresses. Accordingly, the amount of memory addresses that can fit 48-bits is provided as $2^{48}$=281,474,976,710,656 (which is a very large virtual address space). However, most of the virtual address space remains unusable and wasted.

In view of this, implementations of the present disclosure define the VMAs within the OS, and one VMA is provided for each type of main memory in the system (e.g., a dedicated VMA for each type of memory in the hybrid main memory). Implementations of the present disclosure further provide custom memory allocators (CMAs) that each allocate memory for a respective VMA. In some examples, each CMA is provided as computer-executable code as part of the application executable. In some examples, each CMA provides methods to the application to allocate memory. For example, the CMA requests memory from the operating system when the application allocates some memory using CMA.

In some implementations, application developers can program applications to use such CMAs to allocate memory on a pre-configured VMA. In some implementations, each VMA is mapped to a physical memory device through a unique memory mapping (e.g., e820 memory mapping). In this manner, applications can be programmed to allocate memory on a particular main memory of multiple types of main memory, and control data placement. Implementations of the present disclosure ensure that memory allocations are allocated on the dedicated VMA, and also ensure the correct translation of virtual addresses to the physical addresses, which represent the underlying, physical memory devices.

In further detail, M$\in$(M$_1$, M$_2$, M$_3$, . . . , M$_n$) is a set of memory devices that can be inserted into the hardware (e.g., the memory bus). Example memory devices include DRAM and SCM, and/or any other appropriate memory device that can be inserted into the memory bus of the hardware. In some implementations, for each memory type, a CMA is provided that creates a unique VMA region in the OS using the existing OS interface. In the Linux OS, for example, a unique VMA with pre-defined starting and ending virtual addresses is provided using mmap, a function that creates a mapping in the virtual address space of the calling process. For each memory device in the set of memory devices, a VMA region is provided, where VMA$\in$(VMA$_1$, VMA$_2$, VMA$_3$, . . . , VMA$_n$) is a set of VMA regions.

In some implementations, a CMA reserves a VMA region for a respective memory device M, the OS reserving the VMA region in memory as an allocated memory. Each CMA explicitly manages the respective, pre-allocated VMA region to handle memory allocation requests coming from the application. For each VMA region, a mapping entry ME (e.g., e820_R1, . . . e820_Rn) is provided in the OS layer, which ensures the correct mapping of virtual addresses to the underlying hardware.

Figure 3:
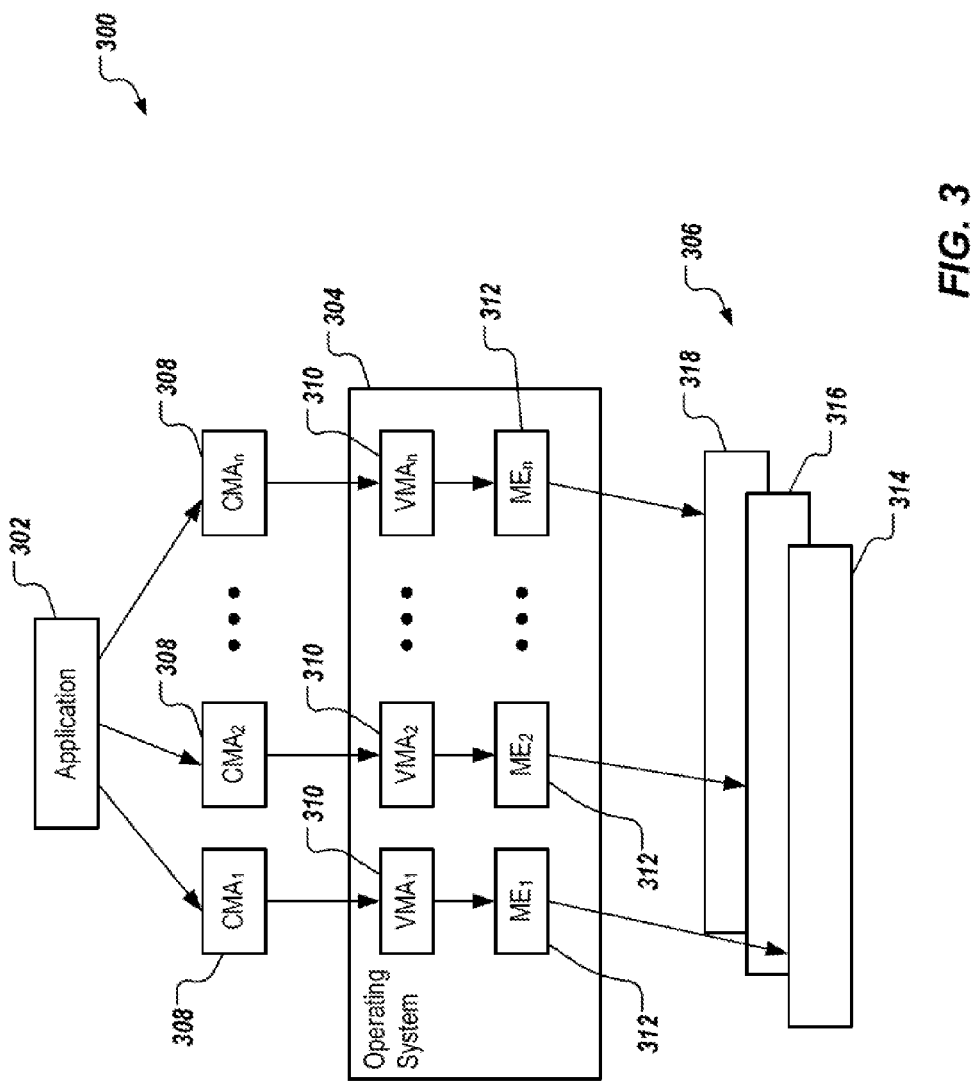
FIG. 3 depicts an example architecture in accordance with implementations of the present disclosure.

FIG. 3 depicts an example architecture 300 in accordance with implementations of the present disclosure. The example architecture includes an application 302, an OS 304, and physical memory 306. In some examples, the application 302 is the application, for which a developer is to define memory allocations to particular types of memory in accordance with implementations of the present disclosure. In some examples, the application code includes multiple CMAs (e.g., a DRAM CMA, a SCM CMA). If the application requires memory on DRAM, the application uses a 'DRAMalloc' method. If an application requires memory on SCM, the application uses a 'SCMalloc' method for memory allocation.

The example architecture 300 further includes a plurality of CMAs 308. The OS 304 includes a plurality of VMAs 310 and respective MEs. In the depicted example, each CMA 308 corresponds to a respective VMA 310. The physical memory 306 includes a plurality of memory devices 314, 316, 318. In some examples, each memory device 314, 316, 318 is of a respective type (e.g., DRAM, SCM). Each ME 312 corresponds to a respective memory device 314, 316, 318. Accordingly, each memory device 314, 316, 318 is associated with a respective CMA 308, VMA 310, and ME 312.

In some implementations, and as described in detail herein, each CMA 308 reserves a region of a respective VMA 310 for a respective memory device 314, 316, 318. In some implementations, each CMA 308 explicitly manages the respective, pre-allocated VMA 310 to handle memory allocation requests coming from the application 302. For each VMA 310, the respective ME 312 is provided in the OS 304, and ensures the correct mapping of virtual addresses to the underlying hardware.

Figure 4:
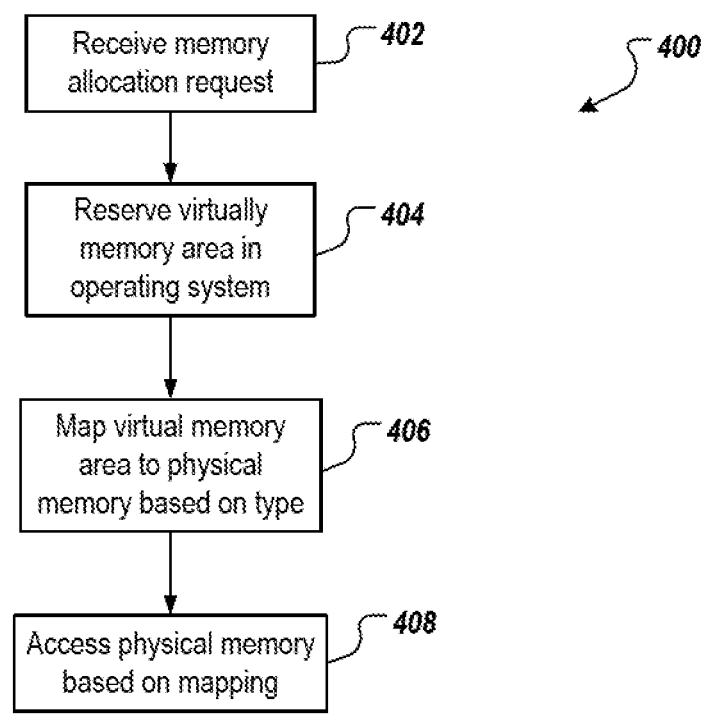
FIG. 4 depicts an example process that can be executed in accordance with implementations of the present disclosure.

FIG. 4 depicts an example process 400 that can be executed in accordance with implementations of the present disclosure. In some implementations, the example process 400 can be realized using one or more computer-executable programs executed using one or more computing devices. For example, components of the example architecture 300 of FIG. 3 can perform at least a portion of the example process 400.

A memory allocation request is received (402). For example, a CMA 308 receives a memory allocation request from the application 302. In some examples, the CMA 308 corresponds to a specific type (e.g., DRAM, SCM) of memory device 314, 316, 318. A virtual memory area is reserved within an operating system (404). For example, the CMA 308 requests a VMA 310 to be reserved in the operating system 304, which reserves the VMA 310 in response to the request. The virtual memory area is mapped to a physical memory based on type (406). For example, the operating system 304 maps the VMA 310 to a physical memory 314, 316, 318 based on type (e.g., DRAM, SCM), as indicated by the respective CMA 308, and provides a respective ME 312. The physical memory is accessed based on the mapping (408). For example, read and write operations to particular types of memory are executed based on the CMA 308, the VMA 310 and the ME 312, such that the type of physical memory indicated by the application 302 is accessed.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. Each of the components 510, 520, 530, 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit. The storage device 530 is capable of providing mass storage for the system 500. In one implementation, the storage device 530 is a computer-readable medium. In various different implementations, the storage device 530 may be a floppy disk device, a hard disk device, an optical disk device, or a tape device. The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device) for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method executed by one or more processors, the method comprising:
    receiving, by one or more processors and from an application being executed, a memory allocation request, the memory allocation request indicating a type of physical memory in a hybrid memory system;
    providing, by the one or more processors, a virtual memory area based on the type of physical memory;
    providing, by the one or more processors, a mapping entry that maps the virtual memory area to the type of physical memory; and
    enabling, by the one or more processors, access to physical memory in the hybrid memory based on a plurality of mapping entries, the mapping entry being included in the plurality of mapping entries.

2. The method of claim 1, wherein the memory allocation request is received by a custom memory allocator of a plurality of custom memory allocators, each custom memory allocator corresponding to a respective type of physical memory in the hybrid memory system.

3. The method of claim 1, wherein an operating system executed by at least one computing device provides the virtual memory area and provides the mapping entry.

4. The method of claim 1, wherein each mapping entry corresponds to a respective type of physical memory in the hybrid memory system.

5. The method of claim 4, wherein each mapping entry is an e820 mapping entry.

6. The method of claim 1, wherein the memory allocation request is provided in response to execution of a memory allocation command of the application.

7. The method of claim 1, wherein the type of physical memory comprises one of dynamic random access memory (DRAM) and storage class memory (SCM).

8. A non-transitory computer-readable storage medium coupled to one or more processors and having instructions stored thereon which, when executed by the one or more processors, cause the one or more processors to perform operations comprising:
    receiving, from an application being executed, a memory allocation request, the memory allocation request indicating a type of physical memory in a hybrid memory system;
    providing a virtual memory area based on the type of physical memory;
    providing a mapping entry that maps the virtual memory area to the type of physical memory; and
    enabling access to physical memory in the hybrid memory based on a plurality of mapping entries, the mapping entry being included in the plurality of mapping entries.

9. The computer-readable storage medium of claim 8, wherein the memory allocation request is received by a custom memory allocator of a plurality of custom memory allocators, each custom memory allocator corresponding to a respective type of physical memory in the hybrid memory system.

10. The computer-readable storage medium of claim 8, wherein an operating system executed by at least one computing device provides the virtual memory area and provides the mapping entry.

11. The computer-readable storage medium of claim 8, wherein each mapping entry corresponds to a respective type of physical memory in the hybrid memory system.

12. The computer-readable storage medium of claim 11, wherein each mapping entry is an e820 mapping entry.

13. The computer-readable storage medium of claim 8, wherein the memory allocation request is provided in response to execution of a memory allocation command of the application.

14. The computer-readable storage medium of claim 8, wherein the type of physical memory comprises one of dynamic random access memory (DRAM) and storage class memory (SCM).

15. A system, comprising:
    a computing device; and
    a computer-readable storage device coupled to the computing device and having instructions stored thereon which, when executed by the computing device, cause the computing device to perform operations comprising:
        receiving, from an application being executed, a memory allocation request, the memory allocation request indicating a type of physical memory in a hybrid memory system;
        providing a virtual memory area based on the type of physical memory;
        providing a mapping entry that maps the virtual memory area to the type of physical memory; and
        enabling access to physical memory in the hybrid memory based on a plurality of mapping entries, the mapping entry being included in the plurality of mapping entries.

16. The system of claim 15, wherein the memory allocation request is received by a custom memory allocator of a plurality of custom memory allocators, each custom memory allocator corresponding to a respective type of physical memory in the hybrid memory system.

17. The system of claim 15, wherein an operating system executed by at least one computing device provides the virtual memory area and provides the mapping entry.

18. The system of claim 15, wherein each mapping entry corresponds to a respective type of physical memory in the hybrid memory system.

19. The system of claim 18, wherein each mapping entry is an e820 mapping entry.

20. The system of claim 15, wherein the memory allocation request is provided in response to execution of a memory allocation command of the application.

* * * * *